N. A. Rhoads,
Wringer,
No. 1,361, Reissued Dec. 9, 1862.
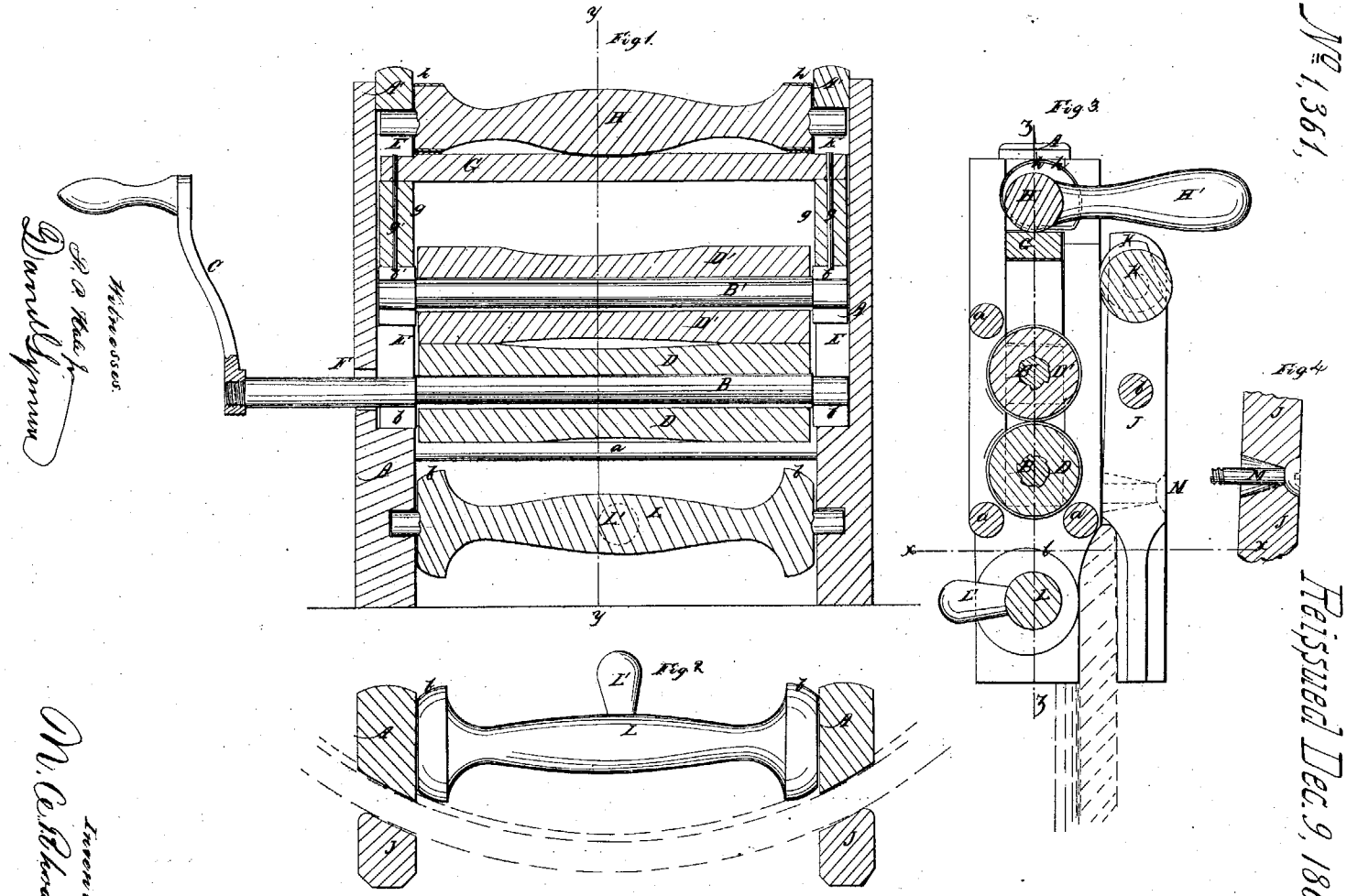
Witnesses.
P. A. Hale Jr.
David Symmes
Inventor.
N. A. Rhoads
N. PETERS, PHOTO-LITHOGRAPHER, WASHINGTON, D. C.

UNITED STATES PATENT OFFICE.

N. A. RHOADS, OF WATERBURY, VERMONT.

IMPROVED CLOTHES-WRINGER.

Specification forming part of Letters Patent No. 34,646, dated March 11, 1862; Reissue No. 1,361, dated December 9, 1862.

DIVISION B.

*To all whom it may concern:*

Be it known that I, N. A. RHOADS, of Waterbury, in the county of Washington and State of Vermont, have invented certain new and useful Improvements in Clothes-Wringers; and I do hereby declare that the following is a full, clear, and exact description thereof, reference being had to the accompanying drawings, making a part of this specification, in which—

Figure 1 is a longitudinal section through the machine, taken in the vertical plane indicated by the red line Z Z in Fig. 3. Fig. 2 is a horizontal section through Fig. 3, as indicated by the red line X X thereon. Fig. 3 is a transverse section through Fig. 1, taken in the vertical plane indicated by the red line Y Y thereon; and Fig. 4 is a partial vertical section in the plane of one of the screws M.

Similar letters of reference indicate corresponding parts in all the figures.

My invention relates to certain novel improvements in that class of clothes-wringers which are made very portable and clamped upon the tub or box in which the clothes are washed and in which the articles are wrung by passing them between two rollers having elastic surfaces and subjecting them at the same time to the requisite degree of pressure to squeeze out the water.

To enable those skilled in the art to make and use my invention, I will proceed to describe its construction and operation.

A A represent two uprights, which are braced together by transverse rods *a a a* so as to form a strong quadrangular frame for containing and supporting the wringing and clamping apparatus.

B B′ are two iron shafts, which have their bearings in journal-boxes *b b b′ b′*. One end of shaft B passes through a vertical slot, F, made through one of the uprights A, and receives on its end a hand-crank, C, by means of which the shaft B is turned in operating the machine. The journal-boxes *b b b′ b′* are let into vertical grooves E E, in which grooves these boxes are allowed to have a free vertical play, so that the shaft B′, while preserving its parallelism with the shaft B, may at the same time be moved farther from and nearer to this shaft, as occasion requires.

The ends of the upper roller, D′, rest on the ends of the lower roller, D, and the upper roller, with its shaft B′, is rotated in its bearings by the rolling friction of the lower roller. India-rubber springs *g g* are placed on the boxes *b′ b′* in the grooves E E, and on these blocks of rubber *g g* the ends of a transverse bar, G, rest. Above this transverse bar G a shaft, H, is arranged, having its upward bearing against the stationary blocks A′ A′. This shaft H is furnished with a lever or handle, H′, and on each end of the shaft is a cam-shaped enlargement, *h*, as shown in Figs. 1 and 3 of the drawings. *h h* are faced with metal, as represented in Fig. 1. These cams *h h* are turned simultaneously by turning the shaft H′ and are used to increase or to diminish the pressure on the articles passed between the rollers D D′, and also to allow large or small articles to be passed between the rollers D D′ and to give the required pressure to all.

On one side of the frame A A, and hinged at M to the uprights of such frame, is a clamping-frame consisting of two parallel clamping-bars, J J, and a transverse bar, *j*, and provided with a rocking cam-shaft, K. This frame is hinged to frame A A by adjusting-screws M, which are inserted strongly into A through tapering holes in the parallel bars J, and allow these bars to rock longitudinally. The clamping of the machine to a tub, barrel, or box may be effected by means of turning the shaft K carrying cams *k* fixed on its end, which on being turned act against A A, as represented, and force the upper ends of frame J outward, and through the rocking of the frame on the screws, acting as hinges at M, also forces the lower ends thereof inward. The screws M may be set farther out and in at pleasure by turning them to the proper extent in either direction, thus increasing and diminishing the distance between the uprights A A and the frame J. The edge of the clamping-ends of the frames A and J are beveled, as represented in Fig. 2, to accommodate them to the curvature of the tub. The screws M, by their ready adjustability, the directness of their strain, and the facility with which they can be purchased or manufactured in any desired shape and size, form a simpler, stronger, and cheaper adjustable connection than any which has been before proposed. The screws M may be turned by a screw-driver or by any other suitable means adapted to turn the same with sufficient force.

The operating of either the cam-shaft K alone while the screws M are left stationary, or the operating of the screws M alone while the cam-shaft K is left stationary, obviously suffices to clamp and release the machine.

In the best mode of using my invention the screws M are adjusted so that the edge of the tub will pass with little difficulty between the uprights A A and frame J, as represented in Figs. 2 and 3 of the drawings. The cam-shaft K is then turned, and the cams *k k* act against the uprights A A and force the lower ends of the frame J hard against the outside of the tub and clamp the machine to the tub rigidly. The rollers D D′ now stand over the inside of the tub, so the water which is wrung from the articles pressed between the rollers will run back into the tub, and the parts are firmly held, so that the crank C may be turned with proper force to induce the rollers D D′ to act efficiently. The wet articles are now taken up—one at a time, if they be large—and passed between the rollers D D, these rollers being turned in the direction indicated by the arrows in Fig. 3. As the articles are passed one or more at a time between the rollers the pressure upon the upper roller, D′, is regulated according to the varying bulk of the articles by working the cam *b b* on shaft H. During the wringing the operator has one hand on the crank C and the other on the handle H′ of the cam-shaft H, and while she turns the rollers D D′ with one hand she can regulate the pressure with the other.

What I claim as my invention, and desire to secure by Letters Patent, is—

The connection of each of the bars J J with the frame A A by means of the adjustable screw M, whereby the distance of the bar J from the frame A may be increased or diminished, as circumstances may require, substantially as herein set forth.

In testimony whereof I have hereunto set my name in presence of two subscribing witnesses.

N. A. RHOADS.

Witnesses:
F. P. HALE, Jr.,
WM. D. HASKELL.